United States Patent [19]

Yoshii et al.

[11] Patent Number: 5,188,334
[45] Date of Patent: Feb. 23, 1993

[54] PINCH VALVE ASSEMBLY WITH A STORAGE MODE

[75] Inventors: Takao Yoshii; Narihiro Oku, both of Kyoto; Yoshio Horii, Yasu; Kunio Terada, Ohtsu, all of Japan

[73] Assignee: Horiba, Ltd., Kyoto, Japan

[21] Appl. No.: 796,473

[22] Filed: Nov. 22, 1991

[30] Foreign Application Priority Data

Nov. 24, 1990 [JP] Japan .................. 2-123083[U]

[51] Int. Cl.$^5$ .................................. F16K 7/04
[52] U.S. Cl. .............................. 251/7; 137/316
[58] Field of Search ................... 251/7; 137/316

[56] References Cited

U.S. PATENT DOCUMENTS 3,882,899  5/1975  Ginsberg et al. ............. 251/7 X
4,230,151  10/1980  Jonsson ........................ 251/7 X
4,634,092  1/1987  Daniell et al. ................ 251/7

FOREIGN PATENT DOCUMENTS 0142462  6/1980  Fed. Rep. of Germany ........ 251/7

Primary Examiner—John C. Fox
Attorney, Agent, or Firm—Price, Gess & Ubell

[57] ABSTRACT

An improved pinch valve assembly for opening and closing flexible tubular conduits is provided. A housing member is capable of supporting flexible tubular conduits and contains an engagement member that is capable of closing the passageways through the flexible tubular conduit. The engagement member can configure to receive a stop member that is capable of restraining the engagement member at a position which prohibits closing of a flexible tubular conduits during non-operative storage and transportation modes of operation.

1 Claim, 5 Drawing Sheets

PINCH VALVE ASSEMBLY WITH A STORAGE MODE

BACKGROUND OF THE INVENTION

1. Field of the Invention

The present invention relates to a pinch valve assembly capable of closing a passageway through a soft tube by pressing a slider that can advance in and retreat from a housing against a portion of the soft tube and more particularly to an improvement to protect the operability of the tube.

2. Description of Related Art

In a pinch valve assembly of this type, a slider can be advanced and retreated by means of a solenoid to close a flexible tube. In a biased-opened pinch valve, the slider is moved to a position where it continually presses against a soft tube, by electrifying the solenoid and it is returned to an initial position, where it does not press against the soft tube, when the solenoid is not driven. On the contrary, in a biased-closed pinch valve, the slider is moved to a position, where it does not press against the soft tube, by electrifying the solenoid and it is subsequently returned to an initial position, where it constantly presses against the soft tube, during the time period when the solenoid is not electrified.

In the above described conventional pinch valve and particularly in a biased-closed pinch valve, the soft tube frequently assumes an inoperative condition when the slider is constantly pressed against it during a passive mode of operation so that the soft tube can become stuck or can be closed under the influence of plasticizers contained therein, when it has not been used and/or can be subjected to a plastic deformation due to the continuous pressing of the slider thereagainst and accordingly damaged. Such conditions can occur when the tube is not subject to pressure fluid conditions, such as during storage or prolonged inactive periods of time.

In order to avoid such a situation, the slider pressing against the soft tube has been attempted to be varied in shape and material. In addition, attempts have been further made to avoid such problems by removing the soft tube from the housing during such time periods, such as transportation and storage, and when it is not used, but a problem has occurred in that the operation for removing and reinstalling the soft tube is particularly troublesome to the technicians.

SUMMARY OF THE INVENTION

In view of the above conventional disadvantages, it is an object of the present invention to provide a pinch valve assembly capable of maintaining an operative soft tube so that it is not pressed during a time period when it is not being used with minimum changes to the structure of the pinch valve assembly.

In order to achieve the above described object, the present invention is characterized in that a slider, provided in a housing in which a part of a soft tube is positioned so as to advance and retreat, is detachably provided with an engaging member. The engaging member can be engaged with a part of the housing to position the slider so that a pressing of the slider against an always-closed soft tube may be released during the time period when the pinch valve assembly is not used.

According to the above described construction, the slider is provided with the engaging member and the engaging member is engaged with a part of the housing to position the slider so that the pressing of the slider against the always-closed soft tube may be released, whereby the slider does not continue to press against the soft tube during the time period when the pinch valve is not used.

In summary, an improved pinch valve assembly for opening and closing flexible tubular conduits includes a housing member, an engagement member mounted in the housing member for reciprocating movement, a solenoid for driving the engagement member in a first direction and a spring for biasing the engagement member in a second direction. Apertures are provided in the housing member to receive a flexible tubular conduit relative to operative contact with the engagement member. The engagement member has an opening therethrough to accommodate the flexible tubular conduit with one end of the engagement member in operative contact with the spring force through the solenoid core, whereby the engagement member can either open or close a passageway through the flexible tubular conduit. The engagement member further includes a groove or aperture.

A stop member for removable engagement with wither the groove or aperture can hold the engagement member in a release position of opening the flexible tubular conduit against the spring force, whereby the flexible tubular conduit is protected during storage and transportation.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

A first embodiment of the present invention is shown in FIGS. 1 to 4, in which.

A second preferred embodiment of the present invention is shown in FIGS. 5 and 6, in which.

A third preferred embodiment of the present invention is shown in FIGS. 7 and 8, in which.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved pinch valve assembly that can be economically manufactured.

The preferred embodiment of the present invention will be below described with reference to the drawings.

Figure 1:
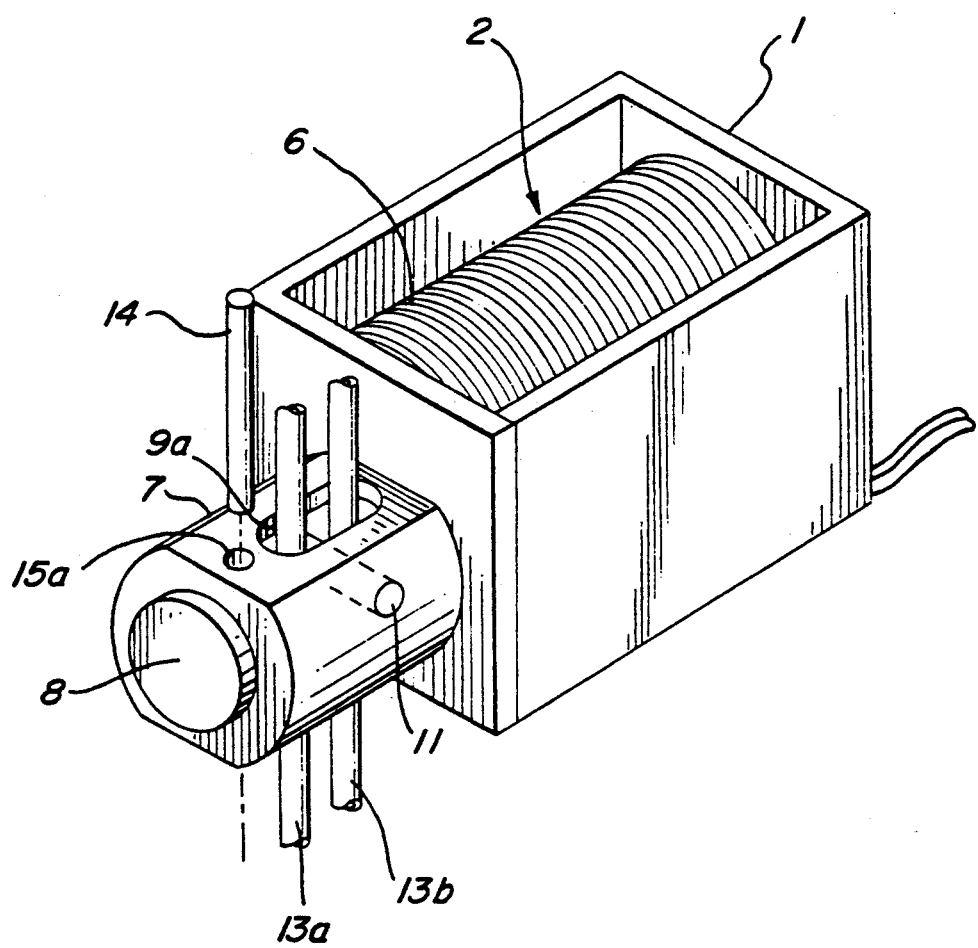
FIG. 1 is a perspective view showing an external appearance of a pinch valve assembly according to a first preferred embodiment of the present invention.
Figure 2:
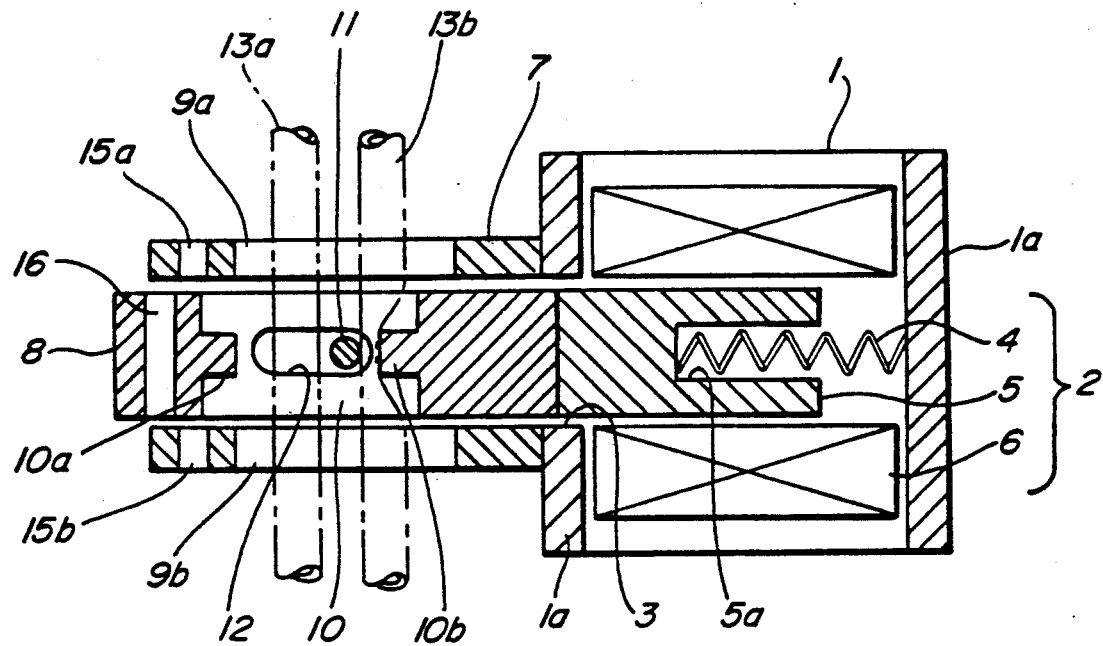
FIG. 2 is a longitudinally sectioned side view showing the pinch valve assembly shown in FIG. 1 during operation.
Figure 3:
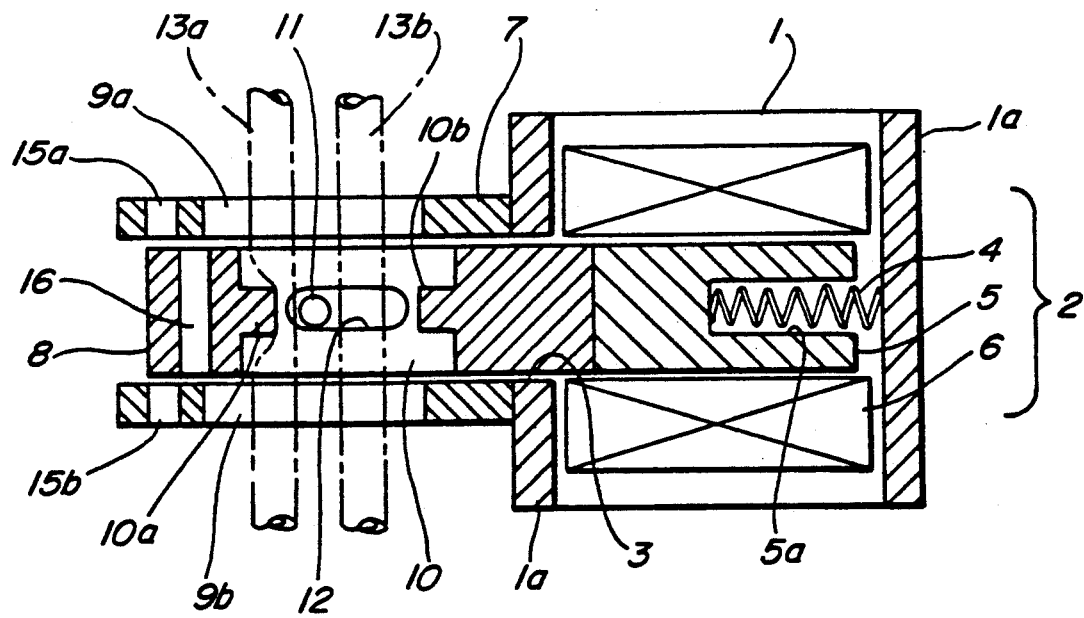
FIG. 3 is a longitudinally sectioned side view showing the pinch valve assembly shown in FIG. 1 during the time period when it is operated.
Figure 4:
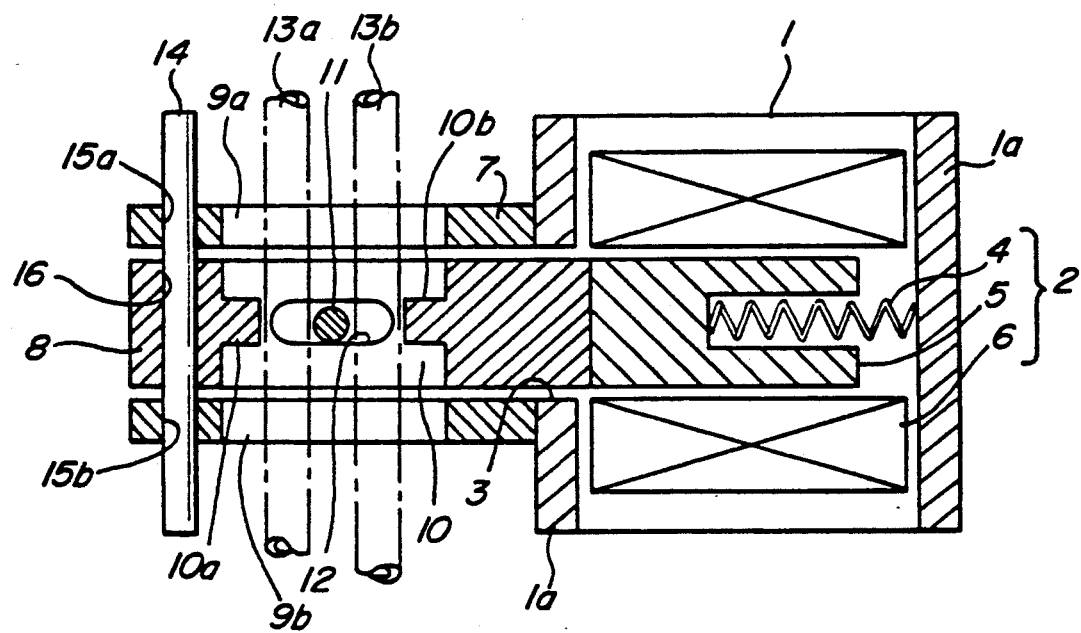
FIG. 4 is a longitudinally sectioned side view showing the pinch valve assembly shown in FIG. 1 during the time period when it is not used.

FIG. 1 is a perspective view showing an external appearance of a pinch valve assembly according to a first preferred embodiment of the present invention. FIG. 2 is a longitudinally sectioned side view showing the pinch valve assembly shown in FIG. 1 during operation. FIG. 3 is longitudinally sectioned side view showing the pinch valve shown in FIG. 1 during the time when it is operated in a reverse direction, and FIG. 4 is a longitudinally sectioned side view showing the pinch valve shown in FIG. 1 during a time period when it is not being used in accordance with the principles of the present invention.

The pinch valve assembly according to this preferred embodiment is provided with both a biased-opened soft tube or a flexible tubular conduit 13a and a biased-closed soft tube or a flexible tubular conduit 13b. A box-type housing 1 is provided at one end with a solenoid 2 therewithin. The solenoid 2 comprises an actuator core 5, which can be positioned by means of a compression coiled spring 4 so as to be biased to be projected out of the box-type housing 1 in a horizontal direction through opening 3 formed in a side wall 1a of the box-type housing 1. An electric coil 6 is arranged so as to surround the actuator 5 for retreating the actuator 5 into the box-type housing 1 against an energizing force of the compression coiled spring 4 when current is passed through the coil 6. The compression coiled spring 4 is provided between a concave portion 5a formed at a rear end of the actuator 5 and a side wall 1a of the box-type housing 1.

The roughly cylindrical housing 7 is fixedly mounted on the side wall 1a of the box-type housing 1 having an opening 3 so as to be positioned concentrically with the opening 3. The actuator 5 is connected with a slider or engagement member 8 projecting from the opening 3 of the box-type housing 1 to advance and retreat within a cylindrical housing 7 connected with the housing to provide a projecting end to the housing 7.

The cylindrical housing 7 is provided with an upper oblong hole 9a and a lower oblong hole 9b for receiving a flexible tube or tubes, respectively. The holes extend in the projecting direction of the cylindrical housing 7 and are formed in an upper portion and a lower portion of a circumferential wall thereof, respectively.

The slider 8 is also provided with an oblong hole or opening 10 to provide a passage that connects the upper hole 9a to the lower hole 9b in the cylindrical housing 7 for enabling flexible tubular conduits to pass therethrough.

The hole 10 has a pressing member 10a projecting from a front portion or end towards a rear or retreating direction of the slider 8 and also a pressing member 10b projecting in the advancing direction of the slider 8. The pressing member can be integrally formed opposite to each other in an inner wall of the opening hole 10.

A rod-like receiving member 11 extends in a direction crossing at right angles with the oblong holes 9a and 9b and horizontally passes through the circumferential wall of the cylindrical housing 7 at a midway position wherein the front and rear pressing members 10a, 10b are opposite to each other. In order to avoid any hindrance of the receiving member 11 to the advancing and retreating operation of the slider 8, the slider 8 is provided with an oblong hole 12 extending along the advancing and retreating direction thereof and formed in both side portions thereof.

The biased-opened soft tube 13a and the biased-closed soft tube 13b pass through the slider 8 and the cylindrical housing 7, respectively, and also through the oblong holes 9a, 10, 9b so as to pass between the pressing member 10a of the oblong hole 10 of the slider 8 and the receiving member 11 and between the other pressing member 10b of the oblong hole 10 of the slider 8 and the receiving member 11, respectively.

A stop member, such as an engaging rod 14, is a rod-like member for positioning the slider 8 at a position where the pressing member 10b of the slider 8 does not press against the biased-closed soft tube 13b, that is, a position where the member 10b of the slider 8 is slightly retreated to the right in FIG. 4 against the energizing force of the compression coiled spring 4 under the normal operative condition that the coil 6 of the solenoid 2 is not driven by an electric current. A tube or a rod-like member made of, for example, a relatively soft, easily deformable and highly smooth material, such as polypropylene, is suitable for use as the engaging rod 14.

The cylindrical housing 7 is provided, adjacent one end, with inserting holes 15a, 15b, through which the engaging rod 14 can be passed. The holes are, respectively, formed in an upper portion and a lower portion of a circumferential wall. Also the slider 8 is provided with a through hole 16, which can be aligned with the inserting holes 15a, 15b of the cylindrical housing 7 so that the slider 8 can be held at a retreated position whereby the pressing member 10b will not press against the soft tube 13b, which is to be biased-closed in an operative position.

Next, an operation of the pinch valve assembly will be described. When the coil 6 of the solenoid 2 is not electrified, in short, the normal operative condition of the valve assembly, the actuator 5 is pressed to the side of the cylindrical housing 7, as shown in FIG. 2, by the energizing force of the compression coiled spring 4. As a result, the soft tube 13b is pressed by the pressing member 10b of the slider 8 at one side thereof and by the receiving member 11 at the other side thereof to be biased-closed or pinched. The amount of spring force has been predetermined to ensure a closed condition. Accordingly, the passageway of the soft tube 13b is cut off at this time to inhibit fluid flow.

In addition, at this time, the other pressing member 10a of the slider 8 slightly advances toward the projection end side of the slider 8 from the receiving member 11. As a result, the soft tube 13a is released from any pressing force by the pressing member 10a to be biased-open. Accordingly, a passageway of the soft tube 13a is opened at this time.

On the other hand, when the coil 6 of the solenoid 2 is electrified, that is, placed in operation, the actuator 5 is withdrawn into the box-type housing 1 against the energizing force of the compression coiled spring 4 as an overriding magnetic force generated in the coil 6, so that the pressing member 10b of the slider 8 is also retreated to a position where it does not press against the soft tube 13b, as shown in FIG. 3. As a result, the passageway of the soft tube 13a is opened.

At this time, the other pressing member 10a of the slider 8 is pressed against one side of the soft tube 13a and the opposite side of this tube is received by means of the receiving member 11. As a result, the passageway of the normally biased-opened soft tube 13a is cut off. In a storage or non-operation mode, the slider 8 can be pressed or moved into a position where the through-hole 16 is aligned with the inserting holes 15a, 15b of the cylindrical housing against the force of the compression coiled spring 4, as shown in FIG. 4, from the usual condition shown in FIG. 2, to enable the engaging rod 14 to pass through the inserting holes 15a, 15b and the through-hole 16, whereby the slider 8 can be held in a non-operative storage position.

At this time, the pressing member 10b of the slider 8 is slightly retreated toward the side of the box-type housing 1 to release any pressing force thereof against the soft tube 10b. Accordingly, even though the non-operative state is required to be released before operation, there is no possibility that the normally biased-close soft tube 10b is stuck or closed by the plasticizers contained therein and/or plastically deformed and damaged by a pressing engagement. In addition, at this time, the other pressing member 10a of the slider 8 slightly approaches to the side of the receiving member 11, but the pressing member 10a does not press against the biased-opened soft tube 13a.

Figure 5:
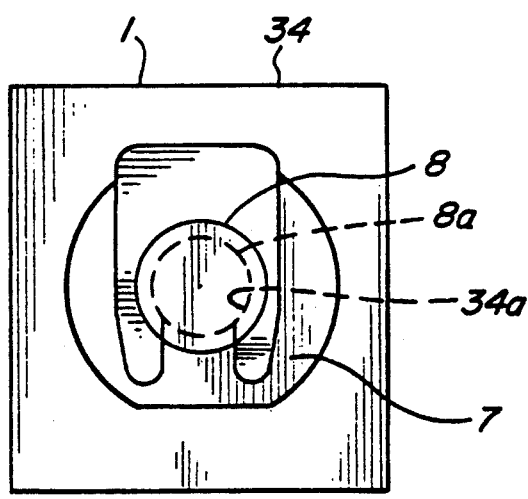
FIG. 5 is a front view showing a pinch valve assembly according to the second preferred embodiment of the present invention.
Figure 6:
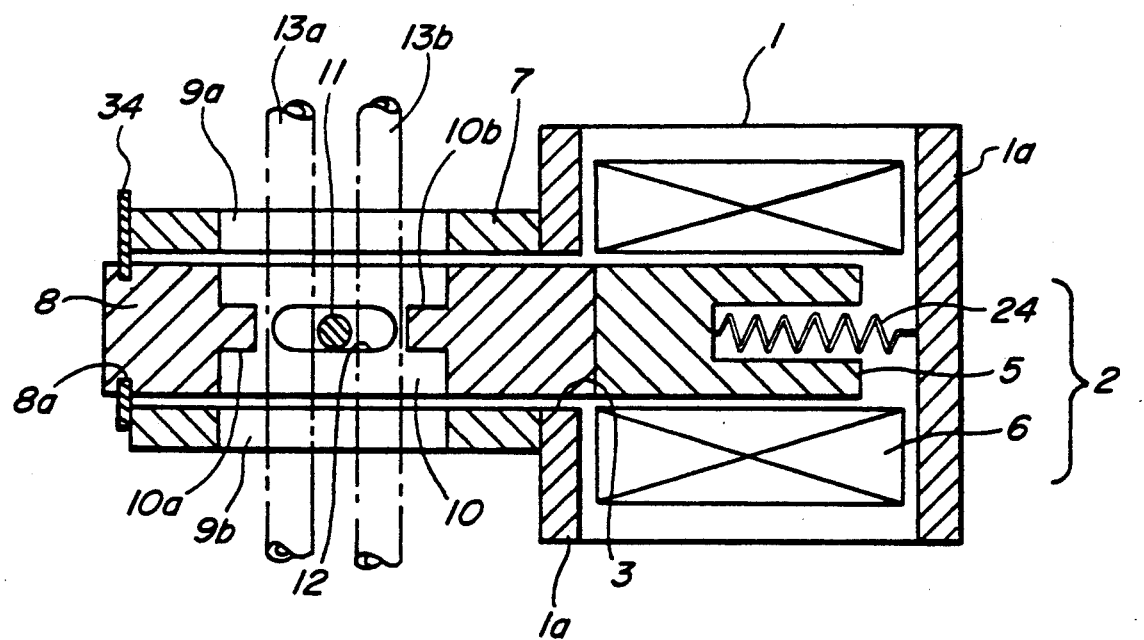
FIG. 6 is a longitudinally sectioned side view showing the pinch valve assembly shown in FIG. 5.

FIG. 5 is a front view showing a pinch valve assembly according to a second preferred embodiment of the present invention. FIG. 6 is a longitudinally sectioned side view showing the pinch valve assembly in FIG. 5.

This embodiment shows a pinch valve assembly having a construction wherein a slider 8 can be retreated toward the side of a box-type housing 1 under a normal condition. In this pinch valve assembly, a rear end of an actuator 5, composing a solenoid 2, is connected with a side wall 1a of the box-type housing 1 through a tension coiled spring 24. Accordingly, during a time period when the coil 6 is not electrified, the actuator 5 and the slider 8, connected with the actuator 5, are pulled toward the box-type housing 1 by the action of the tension coiled spring 24. When the coil 6 is electrified, the slider 8 is advanced within the cylindrical housing 1 against a tensile force of the tension coiled spring 24.

Consequently, in this pinch valve assembly a soft tube 13a, inserted between a pressing member 10a of the slider 8 and a receiving member 11, is always closed while a soft tube 13b, inserted between the receiving member 11 and the other pressing member 10b, is always opened.

According to this preferred embodiment, a stop member or flexible engaging piece 34, having an engaging opening 34a, which is opened in a dovetail, C-letter shape, is formed of a plastic plate or metallic plate and is used as engaging means for regulating the slider 8 into a fixed position during non-operation in place of the engaging rod 14 in the former preferred embodiment. An E-ring may be alternatively used as the engaging piece 34.

The slider 8 is provide with an annular groove 8a formed on a circumferential surface of a projected end portion thereof and the engaging piece 34 is adapted to be mounted on the slider 8 by detachably engaging the engaging opening 34a of the engaging piece 34 with the groove 8a. The groove 8a of the slider 8 is provided in a position so that the slider 8 may be positioned slightly advanced from that during the normal operative position when the engaging piece 34, engaged with the groove 8a, is engaged with an end of a cylindrical housing 7. Other elements are the same as in the former preferred embodiment and are designated by the same numerals of which description is omitted here.

With the pinch valve assembly according to this preferred embodiment, upon a slight advancing of the slider 8 from a normal condition resulting from the tensile force of the tension coiled spring 24, to engage the engaging piece 34 with the groove 8a during a non-operation, as shown in FIGS. 5, 6, the projecting portion of the engaging piece 34 is engaged with an end of the cylindrical housing 7 to hold the slider 8 at such position.

At this time the pressing member 10a of the slider 8 is advanced on the side of an end of the slider 8 until it achieves a position where any pressing force against the normally biased-closed soft tube 13a is completely released. Accordingly, there is no possibility that the soft tube 13a will be stuck closed or plastically deformed and damaged. At the same time, the other pressing member 10b is similarly advanced but the biased-opened soft tube 13b is not yet engaged.

Figure 7:
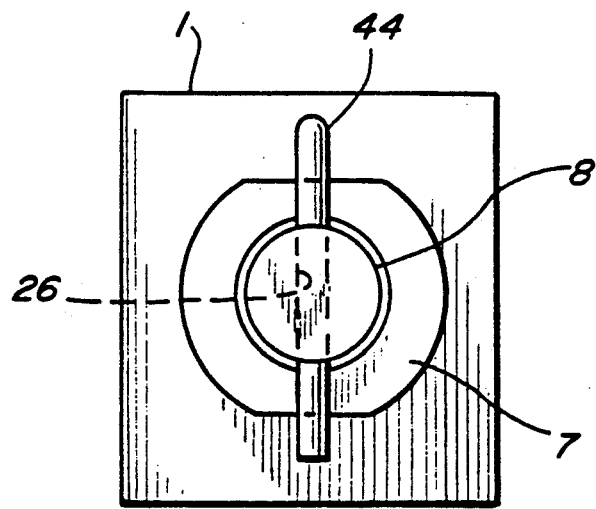
FIG. 7 is a front view showing a pinch valve assembly according to the third preferred embodiment of the present invention.
Figure 8:
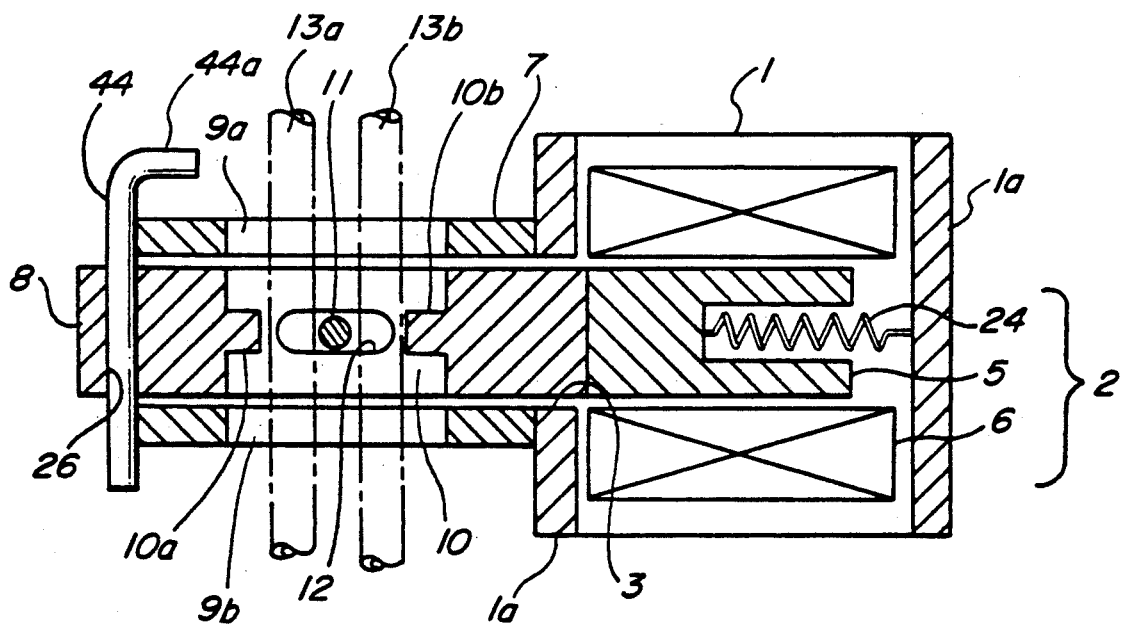
FIG. 8 is a longitudinally sectioned side view showing the pinch valve assembly shown in FIG. 7.

FIG. 7 is a front view showing a pinch valve assembly according to a third preferred embodiment of the present invention, and FIG. 8 is a longitudinally sectioned side view showing said pinch valve assembly shown in FIG. 7. This preferred embodiment shows a case where the pinch valve assembly is adapted so that a slider 8 may be retreated toward the side of a box-type housing 1 under a normal condition in the same manner as in the second preferred embodiment. In this preferred embodiment, an engaging rod 44 is used as the stopper element or engaging means for regulating the slider 8 into a position in place of the engaging piece 34 in the second preferred embodiment.

The slider 8 is provided with a through hole 26, through which the engaging rod 44 is to be passed, formed in a projecting end portion thereof, and the slider 8 is moved to a position slightly advanced from that in the normal mode of operation by engaging a part of the engaging rod 44, passing through the through hole 26, with an end of the cylindrical housing 7. The engaging rod 44 is provided with an L-shaped bent portion 44a formed at an upper end thereof. The bent portion 44a prevents the engaging rod 44 from falling out of the through hole 26. In addition, the bent portion 44a is used also as a knob for mounting the engaging rod 44 on the slider 8 and removing the engaging rod 44 from the slider 8. Also, this engaging rod 44 is preferably formed as a tube or a rod made of relatively soft, easily deformable and highly slidable material, such as polypropylene, in the same manner as the engaging rod 14 in the first preferred embodiment.

In addition, although the pinch valve assembly with the soft tubes 13a, 13b, passing through the cylindrical housing 7 and the slider 8, is shown in the above described respective preferred embodiments, these preferred embodiments are not limited. Also, a construction with a part of the soft tube detachably inserted into the slider through a notched portion formed in a circumferential wall of the cylindrical housing may be provided in the pinch valve assembly.

The present invention with the above described constructions provides a pinch valve assembly adapted to close the passageway of a soft tube by pressing with a slider. The slider is detachably provided with stop member and the stop member is engaged with a part of the housing to position the slider so that the pressing force of the slider against the soft tube may be prevented, so that the slider will not continue to press against the soft tube to cause sticking, plastic deformation and damage and the like of the soft tube when the pinch valve assembly is not being used.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved pinch valve assembly for opening and closing flexible tubular conduits, comprising:

a housing member having aligned openings on opposite sides;

an engagement member mounted in the housing member for reciprocating movement, the engagement member having a first upper elongated opening extending therethrough in a first direction and a second side elongated opening therethrough in a second direction, intersecting the first direction, the second elongated opening defining a pressing edge member at each end of the opening along the second direction;

a receiving rod member having a curved pressing surface positioned intermediate the respective pressing edge members, fixedly connected to the housing member and extending through the second opening, to intersect the first direction;

a pair of flexible tubular conduits extending through the first opening and the respective aligned openings in the housing member, the first opening having a configuration of sufficient size relative to the flexible tubular conduits to permit a degree of movement between the engageable member and the receiving rod member without closing a passageway through the flexible tubular conduits;

means for driving the engagement member in a first direction relative to the housing member, including a solenoid;

means for biasing the engagement member in a second direction relative to the housing member including a spring, one end of the engagement member being operatively connected to the spring, whereby a pressing edge member on the engagement member can either open or close a passageway through a flexible tubular conduit by pressing the flexible tubular conduit against a side of the receiving rod member, the engagement member further having means for receiving a removable stop member, and a stop member for removable engagement with the receiving means which can hold the engagement member in a release position of opening the flexible tubular conduit against the biasing means, whereby the flexible tubular conduit is protected during storage and transportation.

* * * * *